(12) United States Patent
Jagtoyen et al.

(10) Patent No.: US 6,581,375 B2
(45) Date of Patent: Jun. 24, 2003

(54) APPARATUS AND METHOD FOR THE RECOVERY AND PURIFICATION OF WATER FROM THE EXHAUST GASES OF INTERNAL COMBUSTION ENGINES

(75) Inventors: Marit Jagtoyen, Lexington, KY (US); Geoffrey M. Kimber, Cheltenham (GB)

(73) Assignee: Lexington Carbon Company LLC, Lexington, KY (US)

( * ) Notice: Subject to any disclaimer, the term of this patent is extended or adjusted under 35 U.S.C. 154(b) by 0 days.

(21) Appl. No.: 10/024,910

(22) Filed: Dec. 19, 2001

(65) Prior Publication Data

US 2002/0148221 A1 Oct. 17, 2002

Related U.S. Application Data

(60) Provisional application No. 60/257,732, filed on Dec. 22, 2000.

(51) Int. Cl.⁷ .................................................. F01N 3/02
(52) U.S. Cl. .......................... 60/309; 60/274; 210/694; 210/669; 210/900
(58) Field of Search .......................... 60/274, 297, 309; 210/669, 681–688, 694, 900; 95/39, 288

(56) References Cited

U.S. PATENT DOCUMENTS

| 1,653,603 A | | 12/1927 | Schröder |
| 2,071,868 A | | 2/1937 | von Lüde |
| 2,310,767 A | | 2/1943 | Dürr |
| 2,479,766 A | | 8/1949 | Mulvany |
| 3,408,289 A | * | 10/1968 | Gustafson .................... 210/694 |
| 3,985,648 A | * | 10/1976 | Casolo ........................ 210/694 |
| 4,263,263 A | | 4/1981 | Vaseen |
| 4,374,028 A | * | 2/1983 | Medina ....................... 210/669 |
| 4,430,226 A | * | 2/1984 | Hegde et al. ................ 210/686 |
| 4,656,831 A | | 4/1987 | Budininkas et al. |
| 4,725,359 A | * | 2/1988 | Ray .......................... 210/640 |
| 4,813,632 A | | 3/1989 | Woodhouse |
| 4,863,637 A | * | 9/1989 | Matsumoto et al. ......... 210/694 |
| 5,174,902 A | * | 12/1992 | Shubert et al. .............. 210/669 |
| 5,256,268 A | | 10/1993 | Goto et al. |
| 5,607,595 A | | 3/1997 | Hiasa et al. |
| 5,795,843 A | | 8/1998 | Endo |
| 5,857,324 A | | 1/1999 | Scappatura et al. |
| 6,030,698 A | | 2/2000 | Burchell et al. |
| 6,398,965 B1 | * | 6/2002 | Arba et al. .................. 210/900 |

FOREIGN PATENT DOCUMENTS

WO  WO 00/04977  2/2000

OTHER PUBLICATIONS

Jagtoyen, et al., U.S. Army SBIR Contractor's Scientific and Technical Report (Report A002 and A003), "Activated Carbon Fiber Composite for On–board Water Recovery Unit," (SBIR Topic A97090) May 19, 1998.

* cited by examiner

Primary Examiner—Thomas Denion
Assistant Examiner—Tu M. Nguyen
(74) Attorney, Agent, or Firm—Frost Brown Todd LLC

(57) ABSTRACT

A method for the recovery and purification of water from the exhaust gases of an internal combustion engine is disclosed. An apparatus for carrying out that method is also disclosed. In this method, the water is condensed out from the vehicle's exhaust (for example, by using a countercurrent flow heat exchanger in combination with a chiller), and the condensed water is then purified. The purification typically includes passing the water through one or more particulate filters; passing the water through one or more activated carbon filter beds, and passing the water through one or more ion exchange resin filter beds.

28 Claims, 2 Drawing Sheets

Drawing not to scale

APPARATUS AND METHOD FOR THE RECOVERY AND PURIFICATION OF WATER FROM THE EXHAUST GASES OF INTERNAL COMBUSTION ENGINES

CROSS-REFERENCE TO RELATED APPLICATION

This application is based on and claims priority from U.S. Provisional Application No. 60/257,732, filed Dec. 22, 2000.

This invention was developed under U.S. Army grant contract No. DAAE07-98C-X023.

TECHNICAL FIELD

The present invention relates to an apparatus and method for the recovery and purification of water from the exhaust gases of internal combustion engines, such as those used in land transit vehicles, (e.g., cars). More particularly, an on-board, portable device produces potable water from vehicle exhaust gases.

BACKGROUND OF THE INVENTION

Several devices have been utilized over the years to attempt to provide a feasible system for producing potable water from vehicle engine exhaust. These attempts have been generally unsuccessful.

Combustion of diesel, kerosene, gasoline, LP gas or other fossil fuels in an internal combustion engine produce water vapor, which is expelled with the exhaust gases. The present invention allows for the recovery of that water to provide a source of water for potable and other uses. The engine exhaust emissions vary as a function of fuel type and composition, as well as the fuel:air ratio, the type of engine and mode of its operation, and also factors such as ignition timing, cylinder design and fuel additives. Although the relative concentrations of various exhaust components may change depending on the mode of engine operation, generally the nature and content of exhaust remains within a predictable range. It would be useful to be able to capture this water vapor and turn it into drinkable water, particularly for military operations or travel in hostile environments (e.g., desert areas).

The concentration of water vapor in exhaust gases of either gasoline or diesel engines or turbines ranges up to about 10% by volume. Upon cooling the exhaust gases below its dew point, i.e. about 100° F., water begins to condense. Some gases present in the exhaust, such as oxygen, nitrogen and hydrogen, do not condense. The other exhaust components, such as hydrocarbons, sulfur dioxide, nitrogen oxides, carbon dioxide and particulates and suspended solid matter, other dissolved organic and inorganic matter (including metals), contaminate the condensed water by dissolving in or condensing with the water vapor and must be removed to obtain a potable water product. The treatment apparatus for the recovery of potable water from the engine exhaust must condense the water vapor, remove the particulates, and purify the water produced therefrom.

Vehicle exhaust gases and the condensed water produced therefrom are very corrosive. The untreated water that is recovered from the exhaust has a pH of about 3 and, in combination with high temperatures, corrosion easily occurs in pits and crevices of a heat exchanger, ducting and ancillary equipment used to condense it. High exhaust temperatures and the elevated ambient temperatures that prevail under desert/arid conditions exacerbate the rates of chemical attack on materials. Hence, the selection of materials for the components is extremely important.

Attempts to recover drinking water from exhaust gases of vehicles have heretofore been unsuccessful because the purification of the water was not considered technically and commercially feasible (i.e., the apparatus was too large, the impurities were too high and/or the process was too expensive).

SUMMARY OF THE INVENTION

In brief, the present invention relates to a method for recovering potable water from the exhaust gases of an internal combustion engine, comprising the steps of:

(a) cooling said exhaust gases so as to cause water to condense from said gases (for example, utilizing heat exchangers);

(b) passing said water through one or more particulate filters having a maximum pore size of from about 0.1 to about 10 microns;

(c) passing said water through one or more activated carbon beds (a preferred one sequentially combining a wood-based carbon having a majority of pores in the range of from about 17 to about 40 Å, with a coal-based water-treatment carbon having an average pore size of from about 6 to about 20 Å—the wood-based carbon preferably made by phosphoric acid activation and treated to minimize the amount of phosphorous released into the water); and (d) passing said water through one or more ion exchange resin beds (a preferred one being a mixed bed of highly acidic and strongly basic type 1 ion exchange resins with low organics and particulate contaminants with high cation and anion exchange capacity).

Optionally, a buffer such as sodium bicarbonate or a base such as sodium hydroxide may be added to decrease water acidity. The sodium bicarbonate may also improve the taste of the water. These additions may be carried out before either the carbon filtration or the ion exchange resin filtration steps.

This system can provide potable water having TOC less than about 0.5 ppm, an inorganic content less than about 2 ppm, and a pH between about 6 and about 8. The potable water can be produced at a rate of at least about 0.5 gallons of water per gallon of engine fuel combusted.

The present invention also includes an apparatus for recovering potable water from the exhaust gases of an internal combustion engine comprising a means for connecting said apparatus to the exhaust portal of said engine (preferably via the catalytic converter); a means for cooling the exhaust gases so as to cause the water in said gases to condense; a means for collecting said water and channeling it to a purification system which comprises one or more particulate filters having a maximum pore size of from about 0.1 to about 10 microns, one or more activated carbon beds, and one or more ion exchange resin beds; and means for collecting the water which has passed through said purification system.

More specifically, this invention relates to a portable apparatus and the method of recovery and purification of potable water from vehicle exhaust gases. Water can be produced at a rate of at least about 0.5 gallons/gallon of diesel using a 6.5 liter diesel engine with a compression ratio of 21:5:1 and a Brake Mean Effective Pressure (BMEP) of about 300 psi, as is standard issue in a HUMVEE, or "HMMWV" United States armed forces vehicle, while having only a small (i.e. <7%) effect upon the engine performance of the vehicle. A combination of particulate filtration to remove solids, treatment by activated carbon to remove organic compounds and some inorganics, and treatment by ion exchange resin to remove ionic species, provide effective removal of toxic and other contaminants to produce potable water having a purity which exceeds the EPA drinking water standards, as well as the DOD TB MED 577 tri-service water quality standards for long-term consumption.

The activated carbon material used in the instant invention removes essentially all of the organic contaminants, even though some are present at concentrations in the ppb range. The water purification step involves passing the water condensed from the exhaust gases having a high concentration of Total Organic Carbon (TOC) materials of from about 50 to about 250 mg/L and a pH of about 2.8, through a particle filter and an activated carbon filter to obtain TOC levels in a range of from about 3 to about 100 mg/L. The resulting product is then passed through an ion exchange resin to remove metals, inorganic, acidic, and remaining organic contaminants. The filtered water samples have a TOC content below detectable limits (BDL) which is 0.5 mg/L for current EPA drinking water regulations and as low as 0.1 mg/L in some instances. This is a significantly lower TOC than a control sample obtained from the local municipal water supply (2.6 mg/L). Moreover, the filtered samples did not contain any of the hazardous organics mentioned in the EPA's drinking water rules.

The present invention recovers potable water from engine exhaust by manually or automatically diverting a desired portion of the exhaust gas stream to the water recovery system. The exhaust gas is preferably first passed through the vehicle's catalytic converter. The catalytic converter generally contains catalyst consisting of platinum metals, transition metals or mixtures and oxides deposited either on alumina extrusions or honeycomb-type monolithic supports. The catalytic converter needs to be at a certain temperature to completely oxidize the hydrocarbons present in the exhaust. This normally requires temperatures of from about 700° to about 1200° F.

The conditions of the catalytic converter are important to the quality of the produced exhaust condensate. They can significantly affect the amount of particulates and TOC in the condensate. It has been determined that the lifetime of the catalytic converter (for purposes of this invention) is preferably less than about 50,000 miles, more preferably less than about 40,000 miles to produce water with the lowest TOC.

Another important factor is the temperature inside the catalytic converter, which depends mainly on the operating conditions of the vehicle. At low speeds or low vehicle engine loads, the temperature in the exhaust is lower than about 500° F., which is not sufficient for the catalytic converter to fully oxidize the hydrocarbons present in the exhaust. It is preferable that the temperature be at least about 500° F., preferably at least about 600° F., or more preferably at least about 700° F. in order to produce exhaust condensates with as low TOC as possible. In order to produce the highest quality drinking water, the exhaust gases are passed through the catalytic converter and vented through a bypass valve when the temperature in the catalytic converter is below the desired operating range. When the temperature of the catalytic converter reaches its operating range, the bypass valve is closed and the treated exhaust gas flows through the catalytic converter to the water collection unit.

The first part of the water collection unit is heat exchange. The heat exchangers used in the present invention can be manufactured from aluminum coated with Heresite, stainless steel (SS), inconel, ceramics, or graphite, preferably stainless steel, inconel or ceramic. The initial cooling generally takes place in either an air to gas heat exchanger or a counter-current gas to gas heat exchanger. For the air-gas heat exchange system, the exhaust gas is cooled to about 20° F. above ambient temperature. The exhaust may then be further cooled in an air conditioner cooled condenser. In the most likely application scenario, the ambient "desert" temperature is above the exhaust gas dew-point. Thus, ambient air cooling alone will be insufficient to condense any water at all. A source of cooler heat exchange fluid is required and this is most conveniently provided by refrigerant at 30–80° F., or more preferably 30–50° F., from a typical automotive air-conditioning system. The non-condensable gases from the exhaust are vented and the condensed water is pumped or passed by gravity through a particle filter, activated carbon filer and ion exchange resin column for removal of acidic, metallic, inorganic and remaining organic components and is then sent to a storage tank where it can be disinfected if storage is required for prolonged periods of time. Optionally, a small amount of sodium bicarbonate may be added to the water before carbon or ion exchange filtration. This buffers the water, raising its pH so that it will not attack the filters, particularly the ion exchange resins. It may also improve the taste of the water.

Key issues in putting together the water recovery system is the design of a system which fits in a standard vehicle and does not reduce significantly the efficiency of the engine, the removal of particulates and dissolved contaminants which affect taste and odor and can be hazardous to human health, the production of a high enough volume of water to be competitive with alternatives (e.g., carrying a large volume of water), and the ability to work in the high temperature and acidic environment of the exhaust system.

The present invention addresses these issues and will be more fully understood from the following detailed description of the invention.

DETAILED DESCRIPTION OF THE INVENTION

Figure 1:
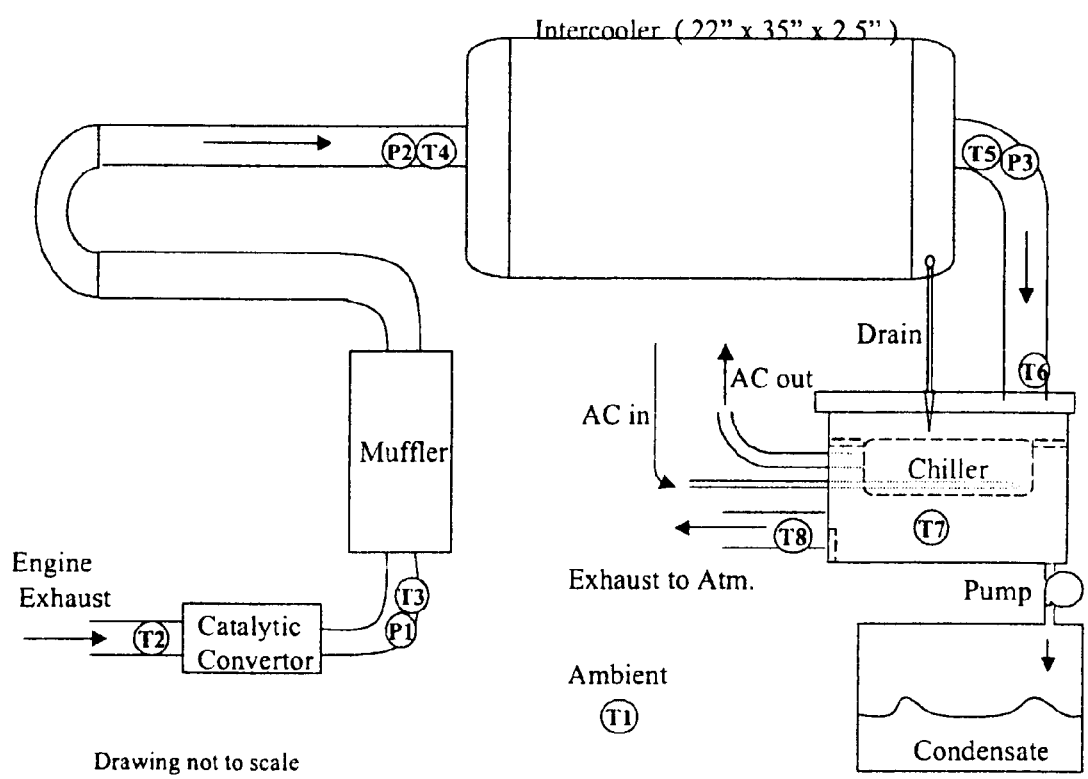
FIG. 1 is a schematic of an exemplary water collection phase of the process of the present invention, using an air-gas heat exchanger.

The process of the present invention is comprised of two parts: the water collection phase during which the water is condensed from the exhaust gases, and the water purification phase during which particulates, organics and other contaminants are removed in order to make the water potable.

In the water collection phase, the hot exhaust gases are cooled causing the water vapor in the exhaust to condense. This may be accomplished by any known cooling mechanism, but is generally done using heat exchangers, cooled by a combination of one or more of the following fluids: ambient air, refrigerant e.g. Freon, or chilled exhaust gas. Prior to entry into the collection phase, the exhaust is preferably passed through the vehicle's catalytic converter to fully oxidize the hydrocarbons in the exhaust to the fullest reasonable extent.

In the water purification phase, the water from the collection phase is treated to remove impurities and make the water potable. This generally is accomplished by passing the water through a particle filter, an activated carbon filter, and an ion exchange resin filter.

Each of these steps will be described in detail below.

1. Water Collection System

Any condensing means known in the art can be used to collect water from the hot exhaust gases. Two possible exemplary alternative mechanisms will be described for the water condensation system. This does not exclude other systems based on ceramic, graphitic, inconel or other heat exchanger-based systems.

A. Exhaust Condensation by Air-Gas Heat Exchange Combined with Chiller

The estimated average temperature of the exhaust at the tail pipe is normally up to about 800° F. The bulk of the cooling of the exhaust is performed in an air-cooled heat exchanger made either from aluminum coated with Heresite, stainless steel, inconel, titanium, ceramic, mesophase pitch, foam or graphite. The intercooler used in this example is normally used to cool charge air after turbo-compression in large truck engines. The particular intercooler used in these experiments may be obtained, for example, from Thermal Control Technologies Corporation of Prescott, Ariz., but can also be obtained from a range of manufacturers. The intercooler core is 35.5" wide and 30.75" high and has a thickness of 2". It consists of aluminum rectangular section tubing with finned inserts both on the process and service sides. This core is modified to reduce corrosion by coating with Heresite, a commercial process which results in a phenolic resin coating that is only thousandths of an inch thick and has only a minimal effect on heat transfer. Two 16" diameter 12 volt DC fans pull ambient air at up to 6,000 scfm through the intercooler. This heat exchanger cools the exhaust gases down to within about 50° F., and usually within about 20° F., of ambient temperature, which may be below the dew point of the gas. If further cooling is necessary (e.g., in a desert environment), the exhaust gases are further cooled by refrigeration, utilizing the engine-driven compressor from the vehicle's air conditioning system (see below). The water is collected in a container, which may optionally contain a demister to prevent fine aerosol water droplets from escaping with the exhaust air. These components can, for example, be mounted on the rear bed of a HMMVW vehicle.

As described above, a chiller, i.e. another heat exchanger, is optionally mounted after the intercooler. One such chiller is a GM Van Rear AC Chiller #1254-3631 which can be installed inside the water collection vessel to save space. The chiller is sealed in the inlet to the vessel so that all exhaust gases must pass the Heresite-coated fins, allowing more cooling of the exhaust gases. The coolant is piped from the front of the vehicle to the rear into the chiller via flexible lines installed under the vehicle along the frame rails and entering the bed of the vehicle through a hole cut into the floor. Optionally, thermal insulation can be added to the chiller vessel. Also optionally, a fan shroud can be added to cover the outlet air side of the intercooler in order to duct the colder air exiting from the second fan down to the hot end of the intercooler. FIG. 1 shows a schematic of an on-board water recovery unit utilizing an air-to-air heat exchanger in combination with a chiller to recover exhaust condensate.

In the Figures, Ⓣ denotes a temperature sensor and Ⓟ denotes a pressure sensor in the apparatus used to carry out the present invention. These pressure and temperature sensors are used to monitor the process of the present invention on an ongoing basis to optimize its performance.

A fan may be used to suck air into the heat exchanger. Moreover, a duct may be placed at a forward or elevated position of the vehicle in order to capture air which has not been subjected to engine heat.

B. Exhaust Condensation by Gas-Gas Counter-Current Flow Heat Exchanger Using Chilled Exhaust as Cooling Medium An alternative system for water recovery includes a counter-current flow heat exchanger, which uses the chiller-cooled exhaust as cooling medium. This heat exchanger can be manufactured in stainless steel (particularly 304 SS), inconel, titanium, ceramic or graphite. If it utilizes narrow (<1 mm) meso channels and ultra thin walls (<0.1 mm), it may be small enough to install under the vehicle or in a wheel arch because it does not need a supply of cool ambient air (as opposed to the air-gas exchanger described above). This does not preclude the desirability of additional heat loss by locating the exchanger in a cool area or by the use of a small amount of fan-blown ambient air.

Figure 2:
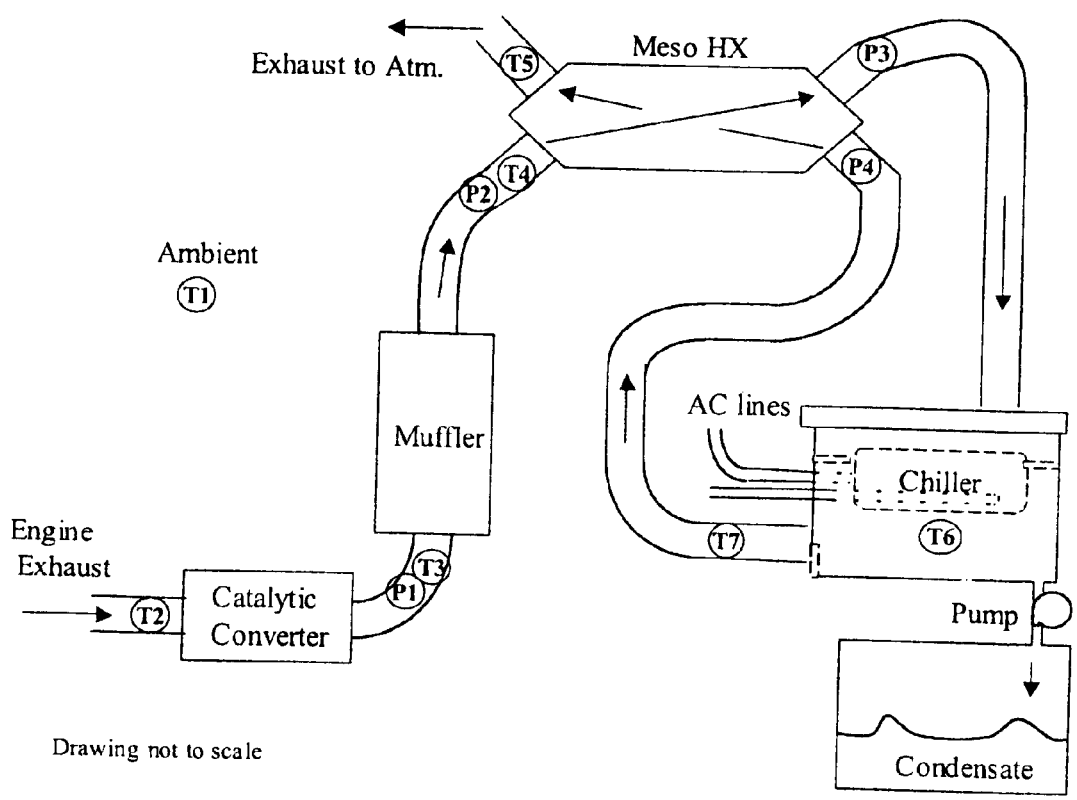
FIG. 2 is a schematic of a water collection phase of the present invention, using a counter-flow heat exchanger.

FIG. 2 shows a schematic for a water recovery system including a counter-current flow heat exchanger.

Refrigerating the exhaust gas already cooled to near ambient temperature and having a relatively high water vapor partial pressure is extremely attractive. For example, cooling the exhaust gases to around 100° F. involves a heat exchange of around 50 kW (e.g., cooling from 600° F. to 100° F.), and possibly no condensation at all if the dew point was 100° F. A further extraction of 5 kW would drop the temperature such that about 15 lbs/hr of water would condense, i.e. a consequent massive increase in the efficiency of the water recovery unit. Moreover, the use of a cooler can reduce the size of the heat exchanger. The compressor and its associated condenser may be shared with the vehicle's air conditioning system or be an independent system. The compressor can be driven by the engine of the vehicle and a switch can be installed to control the compressor and maintain it in the activated position whenever water recovery is desired to be maximized.

An important consideration in selecting a heat exchanger is the material of construction. Aluminum is inexpensive but if coated with Heresite should not be used with temperatures exceeding about 450° F. Stainless steel is heavier and more expensive but provides the durable corrosion resistant material desired. Other alternatives include producing a heat exchanger from ceramics; one such example is a unit similar to those used in catalytic converters, although they need to be rendered impermeable. Other possibilities include inconel, titanium or graphitic foams.

2. Water Purification System

The collected water is filtered in several treatment stages, which can be arranged in a purification train. The first stage involves filtration of particulates from the exhaust condensate using material having an appropriate maximum pore size (e.g., from about 0.1 to about 10 microns, preferably from about 2 to about 10 microns), for example, glass fiber paper having a pore size of from about 1 to about 10 microns. Millipore micron filters with 0.1 micron average pore size made, for example, of Teflon® can also be used. These will have a slower flow rate than the glass fiber paper filters.

The second stage involves adsorption of organics and some inorganics onto a bed of activated carbon. The carbon can be either granular activated carbon (GAC), activated carbon fibers, or composites of activated carbon granules and/or activated carbon fibers. Another form of carbon may be a composite or block of activated carbon containing granular or powdered carbon with a binder. Yet another option is to utilize an activated carbon fiber composite containing powdered activated carbon immobilized within the structure. These materials will prevent bed movement during operation. Examples of such carbon materials are disclosed in PCT Published Application No. WO 00/04977, Jagtoyen et al., published Feb. 3, 2000, incorporated herein by reference.

The activated carbon adsorbent is an important component of the present invention. The main portion of the acidic compounds and other organic compounds are removed by the activated carbon. "The carbon must have a wide range of pore size distribution; one way to do that is by using two different adsorbent carbons."One carbon is, for example, a coal-based granular activated carbon sold commercially for water treatment. The main porosity is due to pores having an average pore size of from about 6 to about 20 Å. The second carbon bed contains wide pores (mesopores) to remove large organics. This carbon has some narrow micropores in the range of from about 6 to about 12 Å, and significant mesoporosity with pores of from about 17 to about 40 Å, and some wider mesopores in the about 40–120 Å range. These numbers are based on pore size distribution analysis by N2 adsorption using the Density Functional Theory (DFT). This carbon can be, for example, a wood-based carbon made by phosphoric acid activation. "A carbon found to be useful in the present invention is a Westvaco carbon that was treated so that it does not release too much phosphorus into the water."

An alternative would be to use an activated carbon fiber composite for the water treatment instead of the coal-based carbon. This material has an open and permeable structure and can be produced in single pieces to a given size and shape. The activated composite can be made from isotropic pitch-derived carbon fibers and exhibits novel properties including rapid rate of adsorption and desorption, the ability to form specific shapes of high permeability and strength.

The open structure of the composites combined with the presentation of the reactive surfaces for adsorption or catalysis in the form of narrow diameter fibers allows direct access of the contacting fluid with minimal mass transfer limitations, and very high rates of adsorption, desorption and reaction. The contaminant removal is better than commercially available filters for many compounds, particularly small organic compounds, and the activated carbon filter also is uniquely effective in that it removes waterborne pathogens with efficiencies of 99.99% or better. This filter is described in PCT Published Application WO 00/04977, Jagtoyen, et al., published Feb. 3, 2000. The carbon filters generally have a minimum surface area of at least about 1000 m$^2$/g.

Another form of carbon may be a composite or block of activated carbon containing granular or powdered carbon with a binder or resin-based carbons. Yet another option is to utilize an activated carbon fiber composite containing powdered activated carbon immobilized within the structure. There will be no bed movement during operation for the composites, hence no loss of fines, degradation and potential for increased pressure drops in the system over time.

Yet another type of carbon can be a surface-treated carbon particularly optimized to remove polar organics from water.

In a preferred embodiment, an effective amount of sodium bicarbonate is added to the condensate to counteract its acidity. This may be done at any point in the process but is preferably done prior to the carbon filtration step. The sodium bicarbonate acts to buffer the water and to improve its taste.

The third stage is filtration through a bed of ion exchange resin. A mixed bed of cation and anion resins can be used to remove the inorganic contaminants, remaining organic compounds that are polar in nature, acids, nitrates and metals. The ion exchange resin bed removes all the detectable inorganic and metal contaminants to below detectable limits. The resin is preferably a mixed bed of strongly acidic and strongly basic type 1 ion-exchange resins. They are of the ultimate purity in terms of organics leaching and particulate contaminants. A preferred ion exchange resin is Amberlite UP6040®, commercially available from Rohm & Haas. In sample runs, the flow rate through the resin was about 217 ml/min, which is about 42 bed volumes per hour. It is preferred that the flow rate through the water purification system be from about 30 to about 50 bed volumes/hr.

A particulate filter is optionally added at the end of the purification train to capture any carbon fines created during filtration. Optionally, the water can be filtered through another activated carbon fiber composite filter. Moreover, the ion exchange resin can be sandwiched between two layers of activated carbon filter composite material utilizing the structural integrity of the composite to support the ion exchange resin to prevent channeling and abrasion forming a monolithic cartridge. Another option is to add a polymeric pre-filter to remove oily compounds. Addition of sodium hydroxide or sodium bicarbonate (or other non-toxic basic salts) before any filtration in order to neutralize the water is a possibility. Zeolites or clays or activated alumina can be used to remove some acids and inorganics. After the purification is complete, the water is stored in a 5–15 gallon container which may or may not contain disinfectants Conventional disinfectants (such as chlorine or mixed oxidants like the MIOX system) can be used at their art-established levels.

The water produced by the present invention is potable, satisfying the following maximum impurity levels: TOC of no greater than 2 ppm, and EPA drinking water standards for all organic and inorganic compounds and metals.

EXAMPLES

The following examples illustrate the process and apparatus of the present invention.

Exhaust condensate was produced while driving a 1994 civilian-equipped Hummer, modified to practice the present invention, using an intercooler coated with Heresite as heat exchanger in combination with a chiller to condense water from the exhaust. Data from different water production runs are shown in Table 1. The average condensate yield was about 0.5 gallons per gallon of fuel. A large sample of condensate which was produced while driving at 60 mph, and had a TOC of 58.6 mg/L, was used as the raw water for the water purification studies reported below.

An example of a water purification train consisted of particulate filters, two different granular carbons and one ion exchange resin filter.

The condensate was first filtered through laminated glass fiber paper (maximum pore size 2 micron) which removed on average 55 ppm of solids. A 0.1 micron filter was used for polishing, although this may not be required. Refiltering one batch through a 0.1 micron filter removed less than 0.01 ppm solids.

C33 (Coal-based GAC): This bed was made using coal-based activated carbon from the Calgon Corporation. The condensate was run through the column at a flow rate of 20 ml/min or 3.7 column volumes per hour. After 0.7 gallons, the TOC was reduced to 8.1 mg/L. The TOC remained between 7 and 8 mg/L, up to 9.4 gallons. At 10.8 gallons, the TOC increased to 9.9 mg/L. After another 1.4 gallons, the TOC had dropped to 5.3 mg/L and remained low for the rest of the treatment.

C34 (Wood-based GAC): After the water was purified through the C33 bed, it was ran through the wood-based GAC bed at 13 ml/min or 2 bed volumes per hour. When this carbon was used after the Calgon carbon (C33), it dropped the TOC down to 3.0 mg/L after 1.3 gallons. When C34 was used after a combination of C33, R11 and R12 (discussed later), the TOC was reduced from 3.2 to 1.5 mg/L after 0.5 gallons and 2.4 mg/L after 0.8 gallons.

R11 (Ionac A-554 resin from Sybron Chemicals, Inc.): This resin is designed to remove nitrogen compounds. When used after C33, this resin actually increased the TOC from 5.3 mg/L to 7.4 mg/L after only 1.3 gallons. But when used after C33 and C34, it had no effect on the TOC (the beginning TOC was 3.0 mg/L and the ending TOC was 2.8 mg/L).

R12 (Resin from Rohm & Haas): This resin, when used after the carbon filtration (with or without R11), removes the remaining contaminants from the condensate. The column height was 24" and column diameter 1". The flow rate through the bed was 218 ml/min or 42 bed volumes per hour. The optimum flow rate for the resin can range from about 1–50 bed volumes per hour.

When R12 was used after the C33–C34 combination, it dropped the TOC from 3.0 mg/L to less than the detection limit of 0.5 mg/L (estimated to be 0.1 mg/L by the instrument). When R12 was used again after the combination of C33C34R12C34, it reduced the TOC to 0.6 mg/L. After the combination of C33C34R11, the TOC was reduced to less than the detection limit of 0.5 mg/L (estimated to be 0.3 mg/L by the instrument).

Good results were achieved by using a combination of the two carbon beds and the Rohm & Haas ion exchange resin column, C33OC34DR12E (referred to as C33E herein). This sample had a TOC of only 0.1 ppm, a pH of 6.8 and conductivity of only 6.1, Table 2. The other sample was purified through both carbon beds and both resin beds, and had a TOC of 0.3 ppm (C33C from now on). It is likely that the second resin bed gave off TOC to the water. The pH of the water is close to neutral at 6.8 and the conductivity is very low, 7.5 $\mu$S/cm. There appears to be a correlation between small amounts of TOC and conductivity. Based on these preliminary data, it is believed that conductivity can be used as a sensor for water purity, as well as an indicator of breakthrough on the ion exchange resin bed.

TABLE 2

TOC, pH and Conductivity of Drinking Water from Exhaust

| Metal Contaminant | MDL | Units | Exhaust Water W103/115 | Purified Water C33O C34DR12E | Purified Water C33LC34O R11AR12AC3 |
|---|---|---|---|---|---|
| TOC | 0.5 | mg/L | 65 | BDL | BDL |
| pH(Lab) | 0.1 | pH | 3.00 | 6.84 | 6.81 |
| Conductivity | 0.1 | $\mu$S/cm | 496.4 | 6.14 | 7.48 |

The highest purity sample C33E was submitted for trace organics analysis (Chemir Labs, Saint Louis, Mo. and EDG, Lexington, Ky.), to identify the nature of the 0.1 ppm of organic compounds left in the water.

ESI MS and GC/MS: The first analytical technique used was Electrospray Ionization Mass Spectrometry (ESI MS) in both the positive and negative ion modes. Positive ion ESI MS produced an ion series consistent with the presence of a small amount of polymer with a separation between the ions of 76 amu. Negative ion ESI did not produce any ions above background.

The second technique used was GC/MS, using a solid phase microextractor (SPME) probe to concentrate the analytes before injection. The analysis indicates the presence of toluene (retention time ~3.2 min) and 2-ethyl-1-hexanol (5.25 min). These compounds are present when the sample analysis is compared to a blank consisting of Millipore purified water. The components are present in very small amounts, and appear to be present in smaller quantities than were observed for the previous analysis.

TABLE 1

Water Collection Results

| Run # | Miles Water Collect. | Fuel Cons (mpg) | Water Amounts (lbs/mile) in fuel | Water Amounts (lbs/mile) air in | Water Amounts (lbs/mile) total in | Water Amounts (lbs/mile) actual yield | Water Amounts (lbs/mile) in outlet total - yield | Yield per gal diesel (gal/gal) | Dew pt. air in (° F.) | Dew pt. exhaust (° F.) | Calc. Temp. IC out (° F.) | Calc. Dew pt. chiller out (° F.) | Calc. Temp. Chiller out (° F.) |
|---|---|---|---|---|---|---|---|---|---|---|---|---|---|
| Steady 50 mph runs | | | | | | | | | | | | | |
| 102 | 84.9 | 14.9 | 0.55 | 0.06 | 0.61 | 0.35 | 0.26 | 0.63 | 29 | 94 | 76 | 61 | 52 |
| 103* | 84.7 | 15.5 | 0.53 | 0.04 | 0.57 | >0.23* | <0.34 | >0.44 | 18 | 97 | 75 | <80 | 52 |
| 115* | 84.8 | 14.0 | 0.59 | 0.06 | 0.65 | 0.31 | 0.33 | 0.50 | 32 | 99 | 139 | 77 | 75 |
| Steady 60 mph runs | | | | | | | | | | | | | |
| 104 | 146.9 | 12.5 | 0.65 | 0.04 | 0.69 | 0.39 | 0.30 | 0.59 | 17 | 102 | 86 | 74 | 54 |
| 105 | 84.8 | 12.9 | 0.64 | 0.09 | 0.73 | 0.36 | 0.37 | 0.56 | 39 | 102 | 106 | 76 | 80 |
| 106 | 81.4 | 12.8 | 0.64 | 0.05 | 0.69 | 0.38 | 0.31 | 0.58 | 25 | 103 | 101 | 78 | 77 |
| 107 | 84.8 | 12.9 | 0.63 | 0.10 | 0.73 | 0.26 | 0.47 | 0.41 | 42 | 103 | 93 | 88 | 80 |
| 108 | 84.8 | 13.1 | 0.63 | 0.04 | 0.67 | 0.34 | 0.33 | 0.53 | 18 | 102 | 94 | 76 | 76 |
| 110 | 84.8 | 12.0 | 0.68 | 0.03 | 0.71 | 0.34 | 0.37 | 0.48 | 13 | 103 | 115 | 83 | 76 |
| 111 | 84.8 | 13.4 | 0.61 | 0.04 | 0.65 | 0.33 | 0.32 | 0.54 | 22 | 99 | 105 | 76 | 71 |
| 113 | 12.3 | 12.8 | 0.64 | 0.07 | 0.71 | 0.44 | 0.27 | 0.67 | 35 | 103 | 105 | 72 | 79 |
| 114 | 74.9 | 13.0 | 0.63 | 0.06 | 0.69 | 0.37 | 0.32 | 0.58 | 29 | 102 | 100 | 78 | 72 |
| 5-50-5 mph runs | | | | | | | | | | | | | |
| 109 | 28.1 | 10.3 | 0.79 | — | — | 0.50 | — | 0.62 | 31 | — | 101 | — | 76 |
| 116 | 28.1 | 10.0 | 0.82 | — | — | 0.43 | — | 0.52 | 27 | — | 143 | — | 77 |

*There were condensed water losses.

GC/MS Analysis: This resolves the sample components based on volatility, and MS detects and identifies the components. Sample components that interact less with the stationary phase spend less time in the chromatographic column. In MS, the resolved sample components are ionized and separated in a mass analyzer. The fragmentation pattern of a sample component and its computer library match enables sample identification.

The organic compounds present in water with TOC of 0.1 and 2.6 ppm are shown in Table 3.

TABLE 3

Organic contaminants present in trace amounts in drinking water samples and a sample with 2.6 ppm TOC

| Contaminants Identified in Trace Amounts | C33C34R12E TOC = 0.1 ppm | C33C34R12E TOC = 0.1 ppm | R12E TOC = 2.6 ppm |
|---|---|---|---|
| Toluene | trace | 0.8 µg/l | trace |
| 4-methyl-2-pentanone | ND | 17 µg/l | ND |
| 2-ethyl-1-hexanol | trace | ND | ND |
| small amount of polymer | trace | ND | ND |
| phosphoric acid, alkyl phosphates | ND | ND | trace |
| 2-ethyl-3-hydroxyethylester of 2 methylpropanoic acid | ND | ND | trace |
| Tributyrin | ND | ND | trace |

Note - TOC limit is 2 ppm for drinking water

All metals identified in the exhaust condensate were reduced below regulated levels. Sodium was found at 2 ppm and lithium at 1.2 ppb. Some metals are present in the <1 ppb range, for example, scandium 0.5 ppb, molybdenum 0.13 ppb, niobium 0.01 ppb, aluminum 0.04 ppb, and calcium is present at less than 0.01 ppb.

To illustrate the purity of the water from exhaust, a UV-VIS scan was performed on the water along with untreated exhaust condensate, Lexington, Ky. drinking water and organic-free drinking water purchased from an independent laboratory. The UV scans show that the exhaust water contains significantly less organic contaminants than both the organic-free lab grade water and the Lexington drinking water.

Specific compositions, methods and embodiments discussed herein are intended to be only illustrative of the invention disclosed by this specification. Variation on these compositions, methods or embodiments are readily apparent to a person of skill in the art based upon the teachings of this specification and are therefore intended to be included as part of the inventions disclosed herein. Reference to documents made in the specification is intended to result in such patents or literature cited are expressly incorporated herein by reference, including any patents or other literature references cited within such documents as if fully set for forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

What is claimed is:

1. A method for recovering potable water from the exhaust gases from an internal combustion engine, comprising the steps of:

(a) cooling said exhaust gases so as to cause water to condense from said exhaust gases; followed by (b) passing said water through one or more particulate filters having a maximum pore size of from about 0.1 to about 10 microns;

(c) passing said water through one or more activated carbon filter beds; and (d) passing said water through one or more ion exchange resin filter beds.

2. The method according to claim 1 wherein the potable water produced has a total organic content (TOC) less than about 0.5 ppm, an inorganic content less than about 2 ppm and a pH between about 6 and about 8.

3. The method according to claim 1 which produces at least about 0.5 gallons of water per gallon of engine fuel combusted.

4. The method according to claim 1 wherein step (d) is followed by passing the water through a second particulate filter having a maxim-am pore size of from about 0.1 to about 10 microns.

5. The method according to claim 1 wherein the water is sequentially passed through steps (b), (c) and (d), in that order.

6. The method according to claim 1 wherein the water is passed through said one or more ion exchange resin filter beds prior to being passed through said one or more activated carbon filter beds.

7. The method according to claim 1 wherein sodium bicarbonate is added to the water in an amount sufficient to neutralize acidity in the water.

8. The method according to claim 7 wherein the sodium bicarbonate is added prior to step (c).

9. The method according to claim 1 wherein the activated carbon beds sequentially comprise a wood-based carbon material having a majority of pores in the range of from about 17 to about 40 Å, and a coal-based water-treatment carbon material having an average pore size of from about 6 to about 20 Å.

10. The method according to claim 9 wherein the ion exchange resin is a mixed bed of cation and anion resin that is strongly acidic and strongly basic type 1 ion exchange resin.

11. The method according to claim 1 wherein the exhaust gas is passed through a catalytic converter prior to the step (a) cooling step.

12. The method according to claim 11 wherein the gases are cooled using one or more heat exchangers.

13. The method according to claim 12 wherein one of said heat exchangers is an ambient air-cooled heat exchanger.

14. The method according to claim 13 utilizing at least two heat exchangers and wherein one of said heat exchangers is a refrigerant-cooled heat exchanger.

15. The method according to claim 14 wherein the activated carbon beds separately comprise a wood-based carbon material having a majority of pores in the range of from about 17 to about 40 Å, and a coal-based water-treatment carbon material having an average pore size of from about 6 to about 20 Å.

16. The method according to claim 15 wherein the ion exchange resin is a mixed bed of cation and anion resin that is strongly acidic and strongly basic type 1 ion change resin.

17. An apparatus for recovering potable water from the exhaust gases of an internal combustion engine comprising a means for connecting said apparatus to the exhaust portal of said engine; a means for cooling the exhaust gases so as to cause the water in said gases to condense; a means for collecting said water and channeling it to a purification system which comprises one or more particulate filters having an average pore size of from about 0.1 to about 10 microns, one or more activated carbon filter beds, and one or more ion exchange resin beds; and means for collecting the water which has passed through said purification system.

18. The apparatus according to claim 17 wherein the flow path of the water takes it sequentially through the one or more particulate filters, the one or more activated carbon filter beds, and the one or more ion exchange resin beds, in that order.

19. The apparatus according to claim 17 wherein the means for cooling the exhaust gases comprises a heat exchanger.

20. The apparatus according to claim 19 wherein the heat exchanger is an ambient air-cooled heat exchanger.

21. The apparatus according to claim 20 wherein the means for cooling the exhaust gases additionally comprises a refrigerant-cooled heat exchanger.

22. The apparatus according to claim 21 which is adapted to connect to a catalytic converter which is connected to the exhaust portal of the engine.

23. The apparatus according to claim 22 which includes a valve which allows the exhaust gas to bypass the apparatus if the temperature of the catalytic converter is below a pre-defined level.

24. The apparatus according to claim 21 wherein the activated carbon beds sequentially comprise a wood-based carbon material having a majority of pores in the range of from about 17 to about 40 Å, and a coal-based water-treatment carbon material having an average pore size of from about 6 to about 20 Å.

25. The apparatus according to claim 24 wherein the ion exchange resin is a mixed bed of cation and anion resin that is strongly acidic and strongly basic type 1 ion exchange resin.

26. A method for recovering potable water from the exhaust gases from an internal combustion engine, comprising the steps of:
  (a) cooling said exhaust gases so as to cause water to condense from said exhaust gases; followed by
  (b) passing said water through one or more particulate filters having a maximum pore size of from about 0.1 to about 10 μm;
  (c) passing said water through one or more activated carbon filter beds comprising a mixture of two carbons, one having an average pore size of from about 6 to about 20 Å, and the other having an average pore size of from about 17 to about 40 Å; and
  (d) passing said water through one or more ion exchange resin filter beds.

27. An apparatus for recovering potable water from the exhaust gases of an internal combustion engine comprising a means for connecting said apparatus to the exhaust portal of said engine; a means for cooling the exhaust gases so as to cause the water in said gases to condense; a means for collecting said water and channeling it to a purification system which comprises one or more particulate filters having an average pore size of from about 0.1 to about 10 μm, one or more activated carbon filter beds comprising a mixture of two carbons, one having an average pore size of from about 6 to about 20 Å, and the other having an average pore size of from about 17 to about 40 Å, and one or more ion exchange resin beds; and means for collecting the water which has passed through said purification system.

28. An apparatus for recovering potable water from the exhaust gases of an internal combustion engine comprising a means for connecting said apparatus to the exhaust portal of said engine, wherein said connection is via a catalytic converter, said connection including a valve which allows the exhaust gas to bypass the apparatus if the temperature of the catalytic converter is below a predefined level; a means for cooling the exhaust gases so as to cause the water in said gases to condense; a means for collecting said water and channeling it to a purification system which comprises one or more particulate filters having an average pore size of from 0.1 to about 10 μm, one or more activated carbon filter beds, and one or more ion exchange resin beds; and a means for collecting the water which has passed through said purification system.

* * * * *

UNITED STATES PATENT AND TRADEMARK OFFICE
CERTIFICATE OF CORRECTION

PATENT NO. : 6,581,375 B2
DATED : June 24, 2003
INVENTOR(S) : Jagtoyen, M and Kimber, G It is certified that error appears in the above-identified patent and that said Letters Patent is hereby corrected as shown below:

Column 7,
Line 8, should read as follows:
-- The carbon must have a wide --
Line 10, should read as follows:
-- different absorbent carbons. --
Line 22, should read as follows:
-- A carbon found to be --
Line 25, should read as follows:
-- water. --

Column 12,
Line 45, should read as follows: -- filter having a maximum --

Signed and Sealed this

Fourteenth Day of December, 2004

JON W. DUDAS
*Director of the United States Patent and Trademark Office*